(12) United States Patent
George-Marchal et al.

(10) Patent No.: US 6,174,429 B1
(45) Date of Patent: Jan. 16, 2001

(54) CATALYST AND PROCESS FOR HYDROCRACKING FRACTIONS THAT CONTAIN HYDROCARBON

(75) Inventors: Nathalie George-Marchal, Paris; Samuel Mignard, Chatou; Slavik Kasztelan, Rueil Malmaison, all of (FR)

(73) Assignee: Institut Francais du Petrole, Rueil Malmaison Cedex (FR)

( * ) Notice: Under 35 U.S.C. 154(b), the term of this patent shall be extended for 0 days.

(21) Appl. No.: 09/175,468

(22) Filed: Oct. 20, 1998

(30) Foreign Application Priority Data

Oct. 20, 1997 (FR) .................................................. 97 13128

(51) Int. Cl.$^7$ .................................................. C10G 47/00
(52) U.S. Cl. .................................. 208/111.01; 208/111.3; 208/111.35; 502/64; 502/66; 502/74; 502/79
(58) Field of Search .................... 208/111.01, 111.35, 208/111.3; 502/64, 66, 74, 79

(56) References Cited

U.S. PATENT DOCUMENTS

| 4,326,947 | | 4/1982 | Sawyer et al. ........................ 208/111 |
| 4,663,025 | * | 5/1987 | Fu ........................................ 208/120 |
| 4,784,750 | * | 11/1988 | Dufresne et al. .................... 208/120 |
| 4,855,036 | * | 8/1989 | Chiang et al. ........................ 208/120 |
| 5,036,033 | * | 7/1991 | West et al. ............................. 502/64 |
| 5,069,890 | * | 12/1991 | Dai et al. ............................... 423/328 |
| 5,190,903 | * | 3/1993 | Steigleder ............................. 502/79 |
| 5,286,692 | | 2/1994 | Zhao et al. ............................. 502/65 |
| 5,288,396 | * | 2/1994 | Ward .................................... 208/111 |
| 5,342,507 | * | 8/1994 | Dai et al. ............................. 208/111 |
| 5,954,946 | * | 9/1999 | Klazinga et al. .................... 208/111 |
| 6,045,687 | * | 4/2000 | Mignard et al. ................... 208/111.3 |
| 6,051,127 | * | 4/2000 | Mourtreaux ............................ 208/58 |

FOREIGN PATENT DOCUMENTS 0 310 165   4/1989   (EP) .

OTHER PUBLICATIONS

Abstract, JP 6–121931 A, Patent Abstracts of Japan, vol. 018, No. 410 (C–1232), Aug. 2, 1994.

* cited by examiner

Primary Examiner—Tom Dunn
(74) Attorney, Agent, or Firm—Millen, White, Zelano & Branigan, P.C.

(57) ABSTRACT

The invention relates to a hydrocracking catalyst that contains at least one metal of group VIB, and/or at least one metal of group VIII of the periodic table, an alumina matrix, phosphorus, optionally at least one element from group VIIA (fluorine), and a zeolite Y that is not fully dealuminificated, with a crystalline parameter that is greater than 2,438 nm, an overall $SiO_2/Al_2O_3$ ratio that is less than 8, and a framework $SiO_2/Al_2O_3$ ratio that is less than 21 and greater than the overall $SiO_2/Al_2O_3$ ratio. The invention also relates to a process for hydrocracking with this catalyst, in particular at low pressure of 7.5 to 11 MPa.

20 Claims, No Drawings

CATALYST AND PROCESS FOR HYDROCRACKING FRACTIONS THAT CONTAIN HYDROCARBON

FIELD OF THE INVENTION

This invention relates to a catalyst for hydrocracking feedstocks that contain hydrocarbon, whereby said catalyst comprises at least one metal from group VIB (group 6 according to the new notation of the periodic table: Handbook of Chemistry and Physics, 76th Edition, 1995–1996), preferably molybdenum and tungsten, and optionally at least one metal from group VIII (groups 8, 9 and 10) of said classification, preferably cobalt, nickel and iron, combined with a substrate that comprises an amorphous or poorly crystallized porous alumina matrix and a non-dealuminated zeolite Y that has a crystalline parameter that is greater than 2,438 nm. The alumina matrix of the catalyst contains phosphorus and optionally at least one element from group VIIA (group 17 of halogens) and in particular fluorine.

This invention also relates to the process for preparation of said catalyst, as well as its use for hydrocracking of feedstocks that contain hydrocarbon, such as petroleum fractions and carbon-derived fractions that contain sulfur and nitrogen in the form of organic compounds, whereby said feedstocks optionally contain metals and/or oxygen.

BACKGROUND OF THE INVENTION

The conventional hydrocracking of petroleum fractions is a very important refining process that makes it possible to produce, from excess heavy feedstocks that contain hydrocarbon, fractions that are lighter than gasolines, jet fuels, and light gas-oils that the refiner seeks in order to adapt production to demand. Compared to catalytic cracking, the advantage of catalytic hydrocracking is to provide middle distillates, jet fuels, and gas-oils of very good quality.

The catalysts that are used in conventional hydrocracking are all of the bifunctional type that combine an acid function with a hydrogenating function. The acid function is provided by substrates with large surface areas (generally 150 to 800 $m^2g^{-1}$) that have a surface acidity, such as the halogenated aluminas (chlorinated or fluorinated in particular), combinations of boron and aluminum oxides, amorphous silica-aluminas and zeolites. The hydrogenating function is provided either by one or more metals of group VIII of the periodic table, such as iron, cobalt, nickel, ruthenium, rhodium, palladium, osmium, iridium, and platinum, or by a combination of at least one metal from group VI of the periodic table, such as chromium, molybdenum, and tungsten and at least one metal from group VIII that is preferably not a noble metal.

The balance between the acid function and the hydrogenating function is the main parameter that controls the activity and selectivity of the catalyst. A weak acid function and a strong hydrogenating function provide low-activity catalysts that work at a generally high temperature (greater than or equal to 390° C.) and at a volumetric flow rate at low feed rate (VVH expressed by volume of feedback to be treated per unit of volume of catalyst and per hour is generally less than or equal to 2) but that have good selectivity for middle distillates. Conversely, a strong acid function and a weak hydrogenating function provide catalysts that are very active but have poor selectivity for middle distillates. Furthermore, a weak acid function is less sensitive to deactivation, in particular by nitrogenous compounds, than a strong acid function. The challenge therefore is to select judiciously each of the functions in order to adjust the activity/selectivity pair of the catalyst.

The low-acidity substrates generally consist of amorphous or poorly crystallized oxides. The low-acidity substrates include the family of amorphous silica-aluminas. Some of the catalysts on the hydrocracking market consist of silica-alumina combined with a combination of sulfides of the metals of groups VIB and VIII. These catalysts make it possible to treat feedstocks that have high contents of heteroatomic poisons, sulfur, and nitrogen. These catalysts have very good selectivity for middle distillates; they are very resistant to the strong nitrogen content, and the products that are formed are of good quality. The drawback of these catalytic systems with an amorphous substrate base is their low activity.

The substrates that have strong acidity generally contain a dealuminated zeolite, for example of the dealuminated Y type or USY (Ultra Stable Y zeolite), combined with a binder, for example alumina. Some catalysts on the hydrocracking market consist of dealuminated zeolite Y and alumina, which is combined either with a metal from group VIII or with a combination of sulfides of the metals of groups VIB and VIII. These catalysts are preferably used for treating feedstocks whose contents of heteroatomic poisons, sulfur, and nitrogens are less than 0.01% by weight. These systems are very active, and the products that are formed are of good quality. The drawback to these catalytic systems with a zeolite substrate base is their selectivity for middle distillates, which is not quite as good as that of catalysts with an amorphous substrate base and very high sensitivity to nitrogen content. These catalyst can tolerate only low nitrogen contents in the feedstock, generally less than 100 ppm by weight.

SUMMARY OF THE INVENTION

The applicant has discovered that, to obtain a hydrocracking catalyst that has a good level of activity and good stability based on feedstocks with high nitrogen content, it is advantageous to combine an acidic amorphous oxide matrix of the alumina type and doped with phosphorus and optionally at least one element from group VIIA and in particular fluorine with a very acidic zeolite Y that is not fully dealuminated.

Zeolite that is not fully dealuminated is defined as a zeolite Y with a faujasite structure (Zeolite Molecular Sieves Structure, Chemistry and Uses, D. W. BRECK, J. WILLEY and Sons 1973). The crystalline parameter of this zeolite may have decreased in value due to the extraction of aluminum from the structure of framework during preparation, but the overall $SiO_2/Al_2O_3$ ratio has not changed since the aluminum has not been extracted chemically. Such a zeolite that is not fully dealuminated therefore has a silicon and aluminum composition that is expressed by the overall $SiO_2/Al_2O_3$ ratio that is equivalent to the starting non-dealuminated zeolite Y. This zeolite Y that is not fully dealuminated may be in hydrogen form or may be at least partially exchanged with metallic cations, for example with cations of alkaline-earth metals and/or cations of rare earth metals of atomic numbers 57 to 71 inclusive. A zeolite that is lacking in rare earths and alkaline-earths will be preferred, likewise for the catalyst.

The zeolite that is not fully dealuminated may be obtained by any treatment that does not extract the aluminum from the sample, such as, for example, treatment with water vapor, treatment by $SiCl_4$ etc.

The catalyst of this invention generally contains, in % by weight relative to the total mass of the catalyst, at least one metal that is selected from the following groups and with the following contents:

1 to 40%, preferably 3 to 45% and even more preferably 5 to 30% of at least one metal from group VIB, and/or, 0.1 to 30%, preferably 0.1 to 25% and even more preferably 0.1 to 20% of at least one metal from group VIII, whereby the catalyst also contains:

1 to 99%, preferably 10 to 98% and even more preferably 15 to 95% and at least one amorphous or poorly crystallized alumina matrix, 0.1 to 80%, or else 0.1 to 60% and preferably 0.1–30%, indeed 0.1–20% and even 0.1–12%, of at least one zeolite Y that is not fully dealuminated with a crystalline parameter that is greater than 2,438 nm,, an overall $SiO_2/Al_2O_3$ molar ratio that is less than 8, a framework $SiO_2/Al_2O_3$ molar ratio that is calculated according to the so-called Fichtner-Schmittler correlation (in Cryst. Res. Tech. 1984, 19, K1) that is less than 21 and greater than $SiO_2/Al_2O_3$ overall.

0.1 to 20%, preferably 0.1 to 15% and even more preferably 0.1 to 10% of phosphorus, and optionally, 0 to 20%, preferably 0.1 to 15%, and even more preferably 0.1 to 10% of at least one element that is selected from group VIIA, preferably fluorine.

The catalysts that are obtained by this invention are produced in the form of grains of various shapes and sizes. They are generally used in the form of cylindrical or polylobed extrudates such as bilobed, trilobed, or polylobed extrudates of straight or twisted shape, but may optionally be manufactured and used in the form of crushed powder, tablets, rings, balls, or wheels. They have a specific surface area, measured by nitrogen adsorption according to the BET method (Brunauer, Emmett, Teller, J. Am. Chem. Soc., Vol. 60, 309–316 (1938)), of greater than 140 m$^2$/g, a total pore volume (VPT), measured by mercury porosimetry, of between 0.2 and 1.5 cm$^2$/g, and a size distribution of pores that can be monomodal, bimodal, or polymodal. Preferably the catalysts of this invention have a monomodal pore distribution.

Advantageously, the catalyst according to the invention has few macropores (<10% of the VPT is located in the pores with a diameter that is greater than 250 Å and preferably 7% of the VPT), the pores with a diameter that is greater than 160 Å represent 1–14% of the VPT, and preferably 1–7%, whereas at least 60% of the PVT (preferably 65%, or better 70%) corresponds to pore diameters of 100–160 Å, whereby the remainder corresponds to pores of <100 Å (1 Å=$10^{-10}$ m).

Thus, in this catalyst the majority of the pores have diameters of 100–160 Å.

Said catalyst has a hydrocracking activity for gas-oil type fractions under vacuum that is superior to that of the catalytic formulas that are known in the prior art. Without being tied to any theory, it seems that this particularly high activity of the catalysts of this invention is due, on the one hand, to the reinforcement of the acidity of the catalyst by the presence of an acidified alumina matrix by the addition of P, which also brings an improvement in the hydrodenitrifying properties of the active phase, which comprises at least one metal from group VIB and optionally at least one metal from group VIII and, on the other hand, by the presence of the very acidic zeolite Y, a good portion of whose acidity will be neutralized by the nitrogenous compounds, but whose acid sites that are left under operating conditions will impart adequate hydrocracking activity to the catalyst.

The catalyst of this invention can be prepared by any of the methods that are well known to one skilled in the art.

Advantageously, said catalyst is obtained by mixing an alumina source that is optionally doped with phosphorus and a starting zeolite Y source, whereby said mixture is then shaped. The elements of groups VIII and/or VIB, group VIIA and phosphorus are introduced completely or partially during mixing, or else completely after shaping (preferred). Shaping is followed by calcination at a temperature of 250 to 600° C. One of the preferred shaping methods in this invention consists in mixing the starting zeolite Y in a moist alumina gel for several tens of minutes, and in then passing the paste that is thus obtained through a die to form extrudates that have a diameter of preferably between 0.4 and 4 mm.

The alumina source is usually selected from the group that is formed by the alumina gels and alumina powders that are obtained by calcination of aluminum hydroxides ad oxyhydroxides. It is preferred to use matrices that contain alumina, in any of these forms that are known to one skilled in the art, for example gamma-alumina.

The preferred zeolite Y source is a zeolite Y powder that is characterized by various specifications: a crystalline parameter of greater than 2,451 nm; an overall $SiO_2/Al_2O_3$ molar ratio of less than 8, a framework $SiO_2/Al_2O_3$ molar ratio, calculated according to the so-called Fichtner-Schmittler correlation (in Cryst. Res. Tech. 1984, 19, K1), of less than 11; a sodium content of less than 0.2% by weight that is determined on the zeolite that is calcined at 1100° C.; a $C_N$, capacity for recovery of sodium ions, expressed in one gram of Na per 100 grams of modified, neutralized, and then calcined zeolite, of greater than about 0.95; a specific surface area, determined by the B.E.T. method, of greater than about 400 m$^2$/g, and preferably greater than 600 m$^2$/g; a water vapor adsorption capacity at 25° C. for a partial pressure of 2.6 torr (or 34.6 MPa) of greater than about 6%, a pore distribution, determined by nitrogen physisorption, that comprises between 5 and 45% and preferably between 5 and 40% of the total pore volume of the zeolite that is contained in pores with a diameter of between $20 \times 10^{-10}$ m and $80 \times 10^{-10}$ m, and between 5 and 45% and preferably between 5 and 40% of the total pore volume of the zeolite that is contained in pores with a diameter that is greater than $80 \times 10^{-10}$ in and generally less than $1000 \times 10^{-10}$ m, whereby the remainder of the pore volume is contained in the pores with a diameter of less than $20 \times 10^{-10}$ m.

The catalyst also contains a hydrogenating function. The hydrogenating function is assured by at least one metal or metal compound of group VI, such as molybdenum and tungsten in particular. It is possible to use a combination of at least one metal or metal compound of group VI (in particular molybdenum or tungsten) and at least one preferably non-noble metal or metal compound of group VIII (in particular cobalt or nickel) of the periodic table.

The hydrogenating function as defined above can be introduced into the catalyst at various levels of preparation and in various ways. It can be introduced only partially (the case, for example, of combinations of metal oxides of groups VI and VIII) or completely at the time of mixing of the alumina source, whereby the remainder of the hydrogenating element(s) is (are) then introduced after mixing and more generally after calcination. Preferably, the metal from group VIII is introduced at the same time as or after the metal from group VI, regardless of the method of introduction. It can be introduced by one or more ion-exchange operations on the calcined substrate that consists of the zeolite that is dispersed in the alumina matrix, with solutions that contain the precursor salts of the metals that are selected when the latter belong to group VIII. It can be introduced by one or more operations for impregnating the substrate that is shaped and calcined by a solution of the precursors of the oxides of the metals of groups VIII (in particular cobalt and nickel) when the precursors of the oxides of metals of group VI (in particular molybdenum or tungsten) have been previously introduced at the time of the mixing of the substrate. Finally, it can be introduced by one or more operations for impregnating the calcined substrate that consists of the zeolite and the alumina matrix that is optionally doped with P and/or F, with solutions that contain the precursors of the oxides of metals of groups VI and/or VIII, whereby the precursors of the oxides of metals of group VIII are preferably introduced after those of group VI or at the same time as the latter.

In the case where the elements are introduced in several impregnations of the corresponding precursor salts, an intermediate calcination stage of the catalyst should be carried out at a temperature of between 250 and 600° C.

The element sources of group VIB that can be used are well known to one skilled in the art. For example, among the sources of molybdenum and tungsten, preferably ammonium oxides and salts, such as ammonium molybdate, ammonium heptamolybdate, and ammonium tungstate are used.

The sources of the element from group VIII that can be used are well known to one skilled in the art. For example, nitrates, sulfates, halides will be used.

The introduction of phosphorus into the catalyst can be carried out at various levels of preparation and in various ways. A preferred method according to the invention consists in preparing an aqueous solution of at least one element from group VI and optionally at least one element from group VIII and a compound of phosphorus and in carrying out so-called dry impregnation, in which the volumes of the pores of the precursor are filled by the solution that contains the metal from group VI, optionally the metal from group VIII, phosphorus, and optionally the element from group VIIA.

The impregnation of molybdenum and/or tungsten can be facilitated by adding phosphoric acid to the solutions, which also makes it possible to introduce phosphorus to promote the catalytic activity. Other phosphorus compounds can be used, as is well known to one skilled in the art.

Phosphorus and the element that is selected from among the halide ions of group VIIA can be introduced by one or more impregnation operations with excess solution in the calcined precursor.

The preferred phosphorus source is orthophosphoric acid $H_3PO_4$, but its salt and esters, such as ammonium phosphates, are also suitable. Phosphomolybdic acid and its salts and phosphotungstic acid and its salts can also be advantageously used. Phosphorus can be introduced in the form of, for example, a mixture of phosphoric acid and a basic organic compound that contains nitrogen, such as ammonia, primary and secondary amines, cyclic amines, compounds of the pyridine family and chinoleines and the compounds of the pyrrole family.

The sources of the element from group VIIA that can be used are well known to one skilled in the art. For example, fluoride anions can be introduced in the form of hydrofluoric acid or its salts. These salts are formed with alkaline metals, ammonium, or an organic compound. In this latter case, the salt is advantageously formed in the reaction mixture by reaction between the organic compound and the hydrofluoric acid. It is also possible to use hydrolyzable compounds that can release fluoride anions in water, such as ammonium fluorosilicate $(NH_4)_2SiF_6$, silicon tetrafluoride $SiF_4$, or sodium tetrafluoride $Na_2SiF_6$. Fluorine can be introduced by, for example, impregnation of an aqueous solution of hydrofluoric acid or ammonium fluoride.

The catalysts that are thus obtained are used for hydrocracking of, in particular, distillate-type heavy fractions that contain hydrocarbon and are under vacuum, deasphalted or hydrotreated residues, or the equivalent. The heavy fractions preferably consist of at least 80% by volume of compounds whose boiling points are at lest 350° C. and preferably between 350 and 580° C. (i.e., corresponding to compounds that contain at least 15 to 20 carbon atoms). They generally contain heteroatoms such as sulfur and nitrogen. The nitrogen content is usually between 1 and 5000 ppm by weight, and the sulfur content is between 0.01 and 5% by weight. Theses feedstocks are lacking in metals, or at most they contain only traces of metal without any effect on the catalyst; the optional metals have been removed by hydrotreatment.

The hydrocracking conditions, such as temperature, pressure, hydrogen recycling rate, and hourly volume rate, can be highly variable depending on the nature of the feedstock, the quality of the products desired, and the facilities that the refined uses. The temperature is generally greater than 200° C. and often between 250° C. and 480° C. The pressure is greater than 0.1 MPa and often greater than 1 MPa. The hydrogen recycling rate is at least 50 and often between 80 and 5000 normal liters of hydrogen per liter of feedstock. The hourly volume rate is generally between 0.1 and 20 volumes of feedstock per volume of catalyst and per hour.

The catalysts of this invention preferably undergo a sulfurization treatment that makes it possible to transform, at least partially, metal sulfide radicals before they are brought into contact with the feedstock that is to be treated. This activation treatment by sulfurization is well known to one skilled in the art and can be carried out by any method that is already described in the literature.

A standard sulfurization method that is well known to one skilled in the art consists in heating, in the presence of hydrogen sulfide, to a temperature of between 150 and 800° C., preferably between 250 and 600° C., generally in a continuous flow reactor.

Finally, owing to the composition of the catalyst, the latter can be readily reproduced.

The catalyst can be used under variable hydrocracking conditions with pressure of at least 2 MPa, a reaction temperature of at least 230° C., an H2/feedstock ratio of at least 100 N1 H2/l of feedstock and an hourly volume rate of 0.1–10 $h^{-1}$.

The treated feedstocks that contain hydrocarbon have initial boiling points of at least 150° C. and preferably at least 350° C., and more advantageously, it is a boiling fraction between 350–580° C.

The catalyst of this invention can be used for hydrocracking of various fractions that contain hydrocarbon, for example, distillate-type fractions, under a vacuum that are strongly loaded with sulfur and nitrogen. In a first partial hydrocracking method, the conversion level is less than 55%. The catalyst according to the invention is then used at a temperature that is generally greater than or equal to 230° C. or to 300° C., generally at most 480° C., and often between 350° C. and 450° C. The pressure is generally greater than 2 MPa and less than or equal to 12 MPa. A moderate pressure range, which is 7.5–11 MPa, preferably 7.5–10 MPa or else 8–11 MPa and advantageously 8.5–10

MPa, is particularly advantageous. The quantity of hydrogen is at least 100 normal liters of hydrogen per liter of feedstock and often between 200 and 3000 normal liters of hydrogen per liter of feedstock. The hourly volume rate is generally between 0.1 and 10 h$^{-1}$. Under these conditions, the catalysts of this invention exhibit better activity in terms of conversion, hydrodesulfurization, and hydrodenitrification than the commercial catalysts.

In this embodiment, the catalyst of this invention can be used for partial hydrocracking, advantageously under conditions of moderate hydrogen pressure, of fractions such as, for example, distillates under vacuum that are strongly loaded with sulfur and nitrogen and that have been previously hydrotreated. In this hydrocracking method, the conversion level is less than 55%. In this case, the petroleum fraction conversion process takes place in two stages, whereby the catalysts according to the invention are used in the second stage. Catalyst 1 of the first stage has a hydrotreatment function and comprises a matrix that preferably has an alumina base and preferably does not contain zeolite, and at least one metal that has a hydrogenating function. Said matrix can also consist of, or contain, silica, silica-alumina, boron oxide, magnesia, zirconia, titanium oxide, or a combination of these oxides. The hydrotreatment function is assured by at least one metal or metal compound of group VIII, such as nickel and cobalt in particular. It is possible to use a combination of at least one metal or metal compound of group VI (in particular molybdenum or tungsten) and at least one metal or metal compound of group VIII (in particular cobalt or nickel) of the periodic table. The total concentration of metal oxides of groups VI and VIII is between 5 and 40% by weight and preferably between 7 and 30% by weight, and the ratio by weight, expressed in metallic oxide of metal (or metals) of group VI to metal (or metals) of group VIII, is between 1.25 and 20 and preferably between 2 and 10. Moreover, this catalyst can contain phosphorus. The phosphorus content, expressed in diphosphorus pentaoxide $P_2O_5$ concentration, will generally be at most 15%, preferably between 0.1 and 15% by weight, and preferably between 0.15 and 10% by weight. It may also contain boron in a(n) (atomic) ratio of B/P=1.05–2, whereby the sum of the contents in B and P, expressed in oxides, is 5–15% by weight.

The first stage generally takes place at a temperature of 350–460° C. and preferably 360–450° C., a total pressure of 2 to 12 MPa; and preferably 7.5–11 MPa, 7.5–10 MPa or 8–11 MPa or 8.5–10 MPa, an hourly volume rate of 0.1–5 h$^{-1}$, and preferably 0.2–2 h$^{-1}$ and with a quantity of hydrogen of at least 100 N1/N1 of feedstock, and preferably 260–3000 N1/N1 of feedstock.

For the conversion stage with the catalyst according to the invention (or second stage), the temperatures are generally greater than or equal to 230° C. and often between 300° C. and 430° C. The pressure is generally between 2 and 12 MPa, preferably 7.5–11 MPa or 7.5–10 MPa or 8–11 MPa or 8.5–10 MPa. The quantity of hydrogen is at least 100 l/l of feedstock and often between 200 and 3000 l/l of hydrogen per liter of feedstock. The hourly volume rate is generally between 0.15 and 10 h$^{-1}$.

Under these conditions, the catalysts of this invention have better activity in terms of conversion, hydrodesulfurization, hydrodenitrification and better selectivity for middle distillates than the commercial catalysts. The life time of the catalysts is improved in the moderate pressure range.

In a second embodiment, the catalyst of this invention can be used for hydrocracking under high hydrogen pressure conditions of at least 8.5 MPa, preferably at least 9 MPa or at least 10 MPa. The treated fractions are, for example, of the distillate type under vacuum and strongly loaded with sulfur and nitrogen that have been previously hydrotreated. In this hydrocracking method, the conversion level is greater than 55%. In this case, the petroleum fraction conversion process takes place in two stages, whereby the catalyst according to the invention is used in the second stage.

Catalyst 1 of the first stage has a hydrotreatment function and comprises a matrix that preferably has an alumina base and preferably does not contain zeolite, and at least one metal that has a hydrogenating function. Said matrix can also consist of, or contain, silica, silica-alumina, boron oxide, magnesia, zirconia, titanium oxide or a combination of these oxides. The hydro-dehydrogenating function is assured by at least one metal or metal compound of group VIII, such as nickel and cobalt in particular. It is possible to use a combination of at least one metal or metal compound of group VI (in particular molybdenum or tungsten) and at least one metal or metal compound of group VIII (in particular cobalt or nickel) of the periodic table. The total concentration of oxides of metals of groups VI and VIII is between 5 and 40% by weight and preferably between 7 and 30% by weight, and the ratio by weight, expressed in metallic oxide of metal (or metals) of group VI to metal (or metals) of group VIII, is between 1.25 and 20 and preferably between 2 and 10. Furthermore, this catalyst can contain phosphorus. The phosphorus content, expressed by concentration of diphosphorus pentaoxide $P_2O_5$, will generally be at most 15%, preferably between 0.1 and 15% by weight and preferably between 0.15 and 10% by weight. It can also contain boron in a B/P=1.02–2 (atomic) ratio, whereby the sum of the contents of B and P that are expressed in oxides is 5–15% by weight.

The first stage takes place generally at a temperature of 350–450° C. and preferably 360–450° C., a pressure greater than 8.5 MPa and preferably greater than 10 MPa, an hourly volume rate of 0.1–5 h$^{-1}$ and preferably 0.2–2 h$^{-1}$, and with a quantity of hydrogen of at least 100 N1/N1 of feedstock and preferably 260–3000 N1/N1 of feedstock.

For the conversion stage with the catalyst according to the invention (or second stage), the temperatures are generally greater than or equal to 230° C. and often between 300° C. and 430° C. The pressure is generally greater than 8.5 MPa and preferably greater than 10 MPa. The quantity of hydrogen is at least 100 l/l of feedstock and often between 200 and 3000 l/l of hydrogen per liter of feedstock. The hourly volume ratio is generally between 0.15 and 10 h$^{-1}$.

Under these conditions, the catalysts of this invention have better conversion activity and better selectivity for middle distillates than the commercial catalysts, even for zeolite contents that are considerably lower than those of the commercial catalysts.

The following examples illustrate this invention without, however, limiting the scope.

Example 1: Production of a Catalyst CP1 Not According to the Invention

Catalyst CP1 is produced in the following way: SB3-type alumina that is supplied by the Condéa Company is extruded through a die with a diameter of 1.4 mm. The extrudates are then dried for one night at 120° C. under air and calcined at 550° C. under air. The extrudates are impregnated in the dry state with an aqueous solution of a mixture of ammonium heptamolybdate, nickel nitrate, and orthophosphoric acid, dried for one night at 120° C. under air, and finally calcined under air at 550° C. The contents by weight of oxides are as follows (relative to the catalyst):

2.9% by weight of nickel oxide NiO 12.6% by weight of molybdenum oxide $MoO_3$ 4.9% by weight of phosphorus oxide $P_2O_5$

Example 2: Production of a Catalyst CP2 Not According to the Invention

Catalyst CP2 is produced in the following way: a Siralox 30-type silica-alumina that is supplied by the Condéa Company is extruded through a die with a diameter of 1.4 mm. This silica-alumina contains about 30% by weight of $SiO_2$. The extrudates are impregnated in the dry state with a solution of a mixture of ammonium heptamolybdate, nickel nitrate, and orthophosphoric acid, dried for one night at 120° C. under air, and finally calcined under air at 550° C. The oxide contents by weight of are as follows (relative to the catalyst):

2.7% by weight of nickel oxide NiO 12.4% by weight of molybdenum oxide $MoO_3$ 4.1% by weight of phosphorus oxide $P_2O_5$ This type of catalyst is representative of the industrial catalyst for partial hydrocracking of distillates under vacuum.

Example 3: Production of a Catalyst CP3 Not According to the Invention

Catalyst CP3 is produced in the following way: 20% by weight of a zeolite Y with a crystalline parameter that is equal to 2.428 nm and an overall SiO2/Al2O3 ratio of 15.2 and a framework SiO2/Al2O3 ratio of 60 that is mixed with 80% by weight of SB30-type alumina that is supplied by the Condéa Company is used. The mixed paste is then extruded through a die with a diameter of 1.4 mm. The extrudates are then dried for one night at 120° C. under air and then calcined at 550° C. under air. The extrudates are impregnated in the dry state with an aqueous solution of a mixture of ammonium heptamolybdate, nickel nitrate, and orthophosphoric acid, dried for one night at 120° C. under air, and finally calcined under air at 550° C. The oxide contents by weight of are as follows (relative to the catalyst):

3.0% by weight of nickel oxide NiO 13.0% by weight of molybdenum oxide $MoO_3$ 4.4% by weight of phosphorus oxide $P_2O_5$ The final catalyst contains 16.3% by weight of zeolite Y with a mesh parameter of 2.428 nm, an overall SiO2/Al2O3 ratio of 15.2, and a framework SiO2/Al2O3 ratio of 60.

Example 4: Production of a Catalyst CP4 Not According to the Invention

Catalyst CP4 is produced in the following way: 20% by weight of a zeolite Y with a crystalline parameter that is equal to 2.453 nm and an overall SiO2/Al2O3 ratio of 6.6 and a framework SiO2/Al2O3 ratio of 8.6 that is mixed with 80% by weight of SB30-type alumina that is supplied by the Condéa Company is used. The mixed paste is then extruded through a die with a diameter of 1.4 mm. The extrudates are impregnated in the dry state with an aqueous solution of a mixture of ammonium heptamolybdate, nickel nitrate, and orthophosphoric acid, dried for one night at 120° C. under air, and finally calcined under air at 550° C. The contents by weight of active oxides are as follows (relative to the catalyst):

2.6% by weight of nickel oxide NiO 12.0% by weight of molybdenum oxide $MoO_3$ 4.4% by weight of phosphorus oxide $P_2O_5$ The final catalyst contains 16.5% by weight of zeolite Y with a mesh parameter of 2.444 nm, an overall SiO2/Al2O3 ratio of 6.6, and a framework SiO2/Al2O3 ratio of 14.2.

Example 5: Production of a Catalyst CP4 Not According to the Invention

Catalyst CP5 is produced in the following way: 8% by weight of a zeolite Y with a crystalline parameter of 2.453 nm and an overall SiO2/Al2O3 ratio of 6.6 and a framework SiO2/Al2O3 ratio of 8.6 that is mixed with 92% by weight of SB30-type alumina that is supplied by the Condéa Company is used. The mixed paste is then extruded through a die with a diameter of 1.4 mm. The extrudates are then dried for one night at 120° C. under air, and then calcined at 550° C. under air. The extrudates are impregnated in the dry state with an aqueous solution of a mixture of ammonium heptamolybdate, nickel nitrate, and orthophosphoric acid contents by weight are as follows (relative to the catalyst):

2.8% by weight of nickel oxide NiO 14.5% by weight of molybdenum oxide $MoO_3$ 4.6% by weight of phosphorus oxide $P_2O_5$ The final catalyst contains 6.1% by weight of zeolite Y with a mesh parameter of 2.443 nm and an overall SiO2/Al2O3 ratio of 6.6 and a framework SiO2/Al2O3 ratio of 14.8.

Example 6: Comparison of Catalysts in Hydrocracking of a Gas-Oil Under Vacuum at Low Pressure.

The catalysts, the steps for whose preparation are descried in the examples above, are used under hydrocracking conditions at moderate pressure on a petroleum feedstock whose main characteristics are as follows:

| | |
|---|---|
| starting point | 365° C. |
| 10% point | 430° C. |
| 50% point | 472° C. |
| 90% point | 504° C. |
| end point | 539° C. |
| pour point | +39° C. |
| density (20/4) | 0.921 |
| sulfur (% by weight) | 2.46 |
| nitrogen (ppm by weight) | 1130 |

The catalytic test unit comprises two fixed-bed reactors, with upward circulation of the feedstock ("up-flow"). 40 ml of catalyst is introduced into each of the reactors. First hydrotreatment stage catalyst HTH548, which is sold by Procatalyse Company and comprises an element from group VI and an element from group VIII that are deposited on alumina, is introduced into the first reactor, the one into which the feedstock passes first. Hydrocracking catalyst (CP1, CP2, CP3 or CP4) is introduced into the second reactor, the one into which the feedstock passes last. The two catalysts undergo an in-situ sulfurization stage before reaction. Any in-situ or ex-situ sulfurization method is suitable. Once the sulfurization is carried out, the feedstock that is described above can be transformed. The total pressure is 8.5 MPa, the hydrogen flow rate is 500 liters of gaseous hydrogen per liter of injected feedstock, and the hourly volume rate is 0.8 $h^{-1}$. The two reactors operate at the same temperature.

The catalytic performance levels are expressed by coarse conversion at 400° C. (CB), by coarse selectivity (SB), and by hydrodesulfurization conversions (HDS) and hydrodenitrification conversions (HDN). These catalytic performance levels are measured on the catalyst after a stabilization period, generally at least 48 hours, has been met.

Coarse conversion CB is set equal to:

CB=% by weight of 380° C.$^{less}$ of the effluent

Coarse selectivity SB is set equal to:

SB=100% by weight of fraction (150° C.–380° C.)/weight of fraction 380° C.$^{less}$ of the effluent.

Hydrodesulfurizing conversion HDS is set equal to:

$$HDS=(S_{starting}-S_{effluent})S_{starting}*100=(24600-S_{effluent})/24600*100$$

Hydrodenitrifying conversion HND is set equal to:

$$HDN=(N_{starting}-N_{effluent})/N_{starting}*100=(1130-N_{effluent})/1130*100$$

In the following table, we recorded coarse conversion CB at 400° C., coarse selectivity SB, hydrodesulfurizing conversion HDS and hydrodenitrifying conversion HDN for the four catalysts.

|  | CP1 NiMoP/ alumina | CP2 NiMoP/ silica-alumina | CP3 NiMoP/ alumina-Y(2,428 nm) | CP4 NiMoP/ alumina-Y(2,453 nm) |
|---|---|---|---|---|
| CB (% by weight) | 40.2 | 42.2 | 48.7 | 52.3 |
| SB | 82.5 | 82.6 | 80.3 | 78.9 |
| HDS (%) | 98.2 | 97.4 | 99.4 | 99.5 |
| HDN (%) | 92.4 | 85.4 | 96.6 | 98.3 |

The use of amorphous catalysts CP1 and CP2 shows that the catalyst that has a silica-alumina matrix provides a better conversion level of fraction 380° C.$^{plus}$ than catalyst CP1 with an alumina base. In contrast, catalyst CP1, which has an alumina substrate, has the advantage of providing better performance levels in hydrotreatment (hydrodesulfurization and hydrodenitrification).

The use of a catalyst with a zeolite base Y (CP3 or CP4) makes it possible to achieve a higher conversion level of fraction 380° C.$^{plus}$ than the one that is obtained with amorphous catalysts (CP1 and CP2). Depending on the zeolite Y type used and compared to catalyst CP2, this conversion gain varies from 6.5% by weight (catalyst CP3 that has a strongly dealuminated zeolite) to 10.1% by weight (catalyst CP4 that has a non-dealuminated zeolite). Coarse selectivity decreases slightly when the conversion increase but remains satisfactory, even for the most active catalyst CP4. Furthermore, the use of an alumina matrix that is combined with these zeolites makes it possible to obtain significantly better catalyst hydrotreatment performance levels (hydrodesulfurization and hydrodenitrification). Catalysts CP3 and CP4, which contain zeolite and an alumina substrate, have higher hydrodesulfurizing and hydrodenitrifying conversion levels than those that are obtained with catalyst CP2, which contains a silica-alumina matrix, does not contain zeolite, and represents a commercial catalyst. Overall, the use of a non-dealuminated zeolite makes it possible to obtain a catalyst CP4 that is significantly more convertible at isotemperature than amorphous catalyst CP1 with a moderate reduction of selectivity and a catalyst that is more desulfurizing and more denitrifying than catalyst CP2, which contains an amorphous acid phase and catalyst CP3, which contains a strongly dealuminated zeolite.

The catalysts that contain an alumina that is acidified by phosphorus and a zeolite that is not fully dealuminated are therefore particularly advantageous for hydrocracking distillate-type feedstock under a vacuum that contains nitrogen at a moderate hydrogen pressure.

Example 7: Comparison of Catalysts for Hydrocracking a Gas-Oil Under a Vacuum at a Higher Pressure The catalysts, the steps for whose preparation are described in the examples above, are used under the hydrocracking conditions at high pressure (12 MPa) on a petroleum feedstock whose main characteristics are as follows:

| | |
|---|---|
| starting point | 277° C. |
| 10% point | 381° C. |
| 50% point | 482° C. |
| 90% point | 531° C. |
| end point | 545° C. |
| pour point | +39° C. |
| density (20/4) | 0.919 |
| sulfur (% by weight) | 2.46 |
| nitrogen (ppm by weight) | 930 |

The catalytic test unit comprises two fixed-bed reactors, with upward circulation of the feedstock ("up-flow"). 40 ml of catalyst is introduced into each of the reactors. Catalyst 1 of first hydrotreatment stage HR360, which is sold by the Procatalyse Company and comprises an element from group VI and an element from group VIII that are deposited on alumina, is introduced into the first reactor, the one into which the feedstock passes first. Second-stage catalyst 2, i.e., the hydroconversion catalyst, is introduced into the second reactor, the one into which the feedstock passes last. The two catalysts undergo an in-situ sulfurizing stage before reaction. Any in-situ or ex-situ sulfurizing method is suitable. Once sulfurization is carried out, the feedstock that is described above can be transformed. The total pressure is 12 MPa, the hydrogen flow is 1000 liters of gaseous hydrogen per liter of injected feedstock, and the hourly volume rate is 0.9 h$^{-1}$.

The catalytic performance levels are expressed by the temperature that makes it possible to achieve a coarse conversion level of 70% and by the coarse selectivity. These catalytic performance levels are measured on the catalyst after a stabilization period, generally at least 48 hours, has elapsed.

Coarse conversion CB is set equal to:

CB=% by weight of 380° C.$^{less}$ of the effluent

Coarse selectivity SB is set equal to:

SB=100% by weight of fraction (150° C.–380° C.)/weight of fraction 380° C.$^{less}$ of the effluent.

The reaction temperature is set so as to achieve a coarse conversion CB that is equal to 70% by weight. In the following table, we recorded the reaction temperatures and the coarse selectivities for two catalysts CP3 and CP5.

| | T(° C.) | SB |
|---|---|---|
| CP3 | 396 | 71 |
| CP5 | 393 | 71.9 |

The use of the catalyst that contains the zeolite that is not fully dealuminated with the alumina matrix that is doped with phosphorus CP5 makes it possible to reach a very high selectivity, higher than that of catalyst CP3, while having a lower reaction temperature since a temperature rise of 3° C. is observed relative to catalyst CP3. It can be noted that these improvements are obtained with a catalyst that has a zeolite content that is much lower than that of the comparison catalyst since a decrease of 16.3% by weight of zeolite to 6.1% has taken place.

The preceding examples can be repeated with similar success by substituting the generically or specifically described reactants and/or operating conditions of this invention for those used in the preceding examples.

The entire disclosure of all applications, patents and publications, cited above, and of corresponding European application No. 97/13,128, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A catalyst comprising:
   1–99% by weight of at least one acidic amorphous alumina-containing matrix,
   0.1–80% by weight of at least one zeolite Y with a crystalline parameter that is greater than 2.438 nm, with an overall $SiO_2/Al_2O_3$ molar ratio that is less than 8 and a framework $SiO_2/Al_2O_3$ molar ratio that is less than 21 and greater than said overall $SiO_2/Al_2O_3$ molar ratio,
   at least one metal component selected from the group consisting of 0.1–30% by weight of at least one metal from group VIII and 1–40% by weight of at least one metal from group VIB,
   0.1–20% by weight of phosphorus,
   0–20% by weight of at least one element from group VIIA.

2. Catalyst according to claim 1, whose element from group VIIA is fluorine.

3. Catalyst according to claim 1, in which the pores with a diameter >25 nm occupy a volume that is less than 10% of the total pore volume (VPT), the pores with a diameter greater than 16 nm occupy 1 to 14% of the VPT; and the pores with a diameter of 10–16 nm occupy at least 60% of the VPT, whereby the remainder corresponds to pores with a diameter that is less than 10 nm.

4. Catalyst according to claim 1 that is obtained by mixing zeolite Y with a moist alumina gel, followed by extrusion and calcination at 250–600° C.

5. A catalyst according to claim 1, wherein the matrix is alumina.

6. A catalyst according to claim 1, wherein the matrix is silica-alumina.

7. A catalyst according to claim 1, comprising a mixture of the group VIII metal component with said group VIB metallic component.

8. A catalyst according to claim 1, wherein the catalyst comprises the metal component of group VIII.

9. A catalyst according to claim 1, wherein the catalyst comprises the metal component of group VIB.

10. A catalyst according to claim 9, wherein the catalyst comprises 5–30% of said metal component.

11. A catalyst according to claim 1, wherein the catalyst comprises 0.1 to 15% of fluorine.

12. A catalyst according to claim 1, wherein the catalyst comprises a zeolite Y having a crystalline parameter greater than 2.451 nm, an $SiO_2/Al_2O_3$ molar of less than 8, a framework $SiO_2/Al_2O_3$ less than 11, a sodium content of less than 0.2% by weight that is determined on the zeolite calcined at 1100° C.; a $C_N$ capacity for recovery of sodium ions, expressed in one gram of Na per 100 grams of modified, neutralized, and then calcined zeolite, of greater than about 0.95; a specific surface area, determined by the B.E.T. method, of greater than about 400 $m^2/g$, a water vapor adsorption capacity at 25° C. for a partial pressure of 2.6 torr (or 34.6 MPa) of greater than about 6% a pore distribution, determined by nitrogen physisorption, comprising based on the total pore volume of the zeolite between 5 and 45% of pores with a diameter of between $20 \times 10^{-10}$ n and $80 \times 10^{-10}$ m, and between 5 and 45% of pores with a diameter greater than $80 \times 10^{-10}$ m and less than $1000 \times 10^{-10}$ with the remainder of the pore volume having pores with a diameter of less than $20 \times 10^{-10}$ m.

13. A catalyst according to claim 12, wherein the specific surface is greater than 600 $m^2/g$, and 5–40% of the total pore volume of the zeolite has pores of a diameter between $20 \times 10^{-10}$ m and $80 \times 10^{-10}$ m, and 5–40% of the total pore volume of the zeolite has pores of a diameter higher than $80 \times 10^{-10}$ m.

14. Process for hydrocracking, with a catalyst according to claim 1, at a pressure of at least 2 MPa, and a temperature of at least 230° C., a quantity of hydrogen of at least 100 Nl H2/l of feedstock and an hourly volume ratio of 0.1–10 $h^{-1}$.

15. Process according to claim 14, in which the pressure is 2–12 MPa, the temperature is 300–480° C., and the conversion is less than 55%.

16. Process according to claim 15, in which the pressure is 7.5–11 MPa.

17. Process according to claim 15, in which the pressure is 8–11 MPa.

18. Process according to claim 14, in which the pressure is at least 8.5 MPa, the temperature is 300–430° C., and the conversion is at least 55%.

19. Process according to claim 18, in which the hydrotreatment catalyst contains at least one metal from group VIII, at least one metal from group VIB and phosphorus, and optionally boron.

20. Process according to claim 14, in which the feedstock is hydrotreated prior to hydrocracking.

* * * * *

UNITED STATES PATENT AND TRADEMARK OFFICE
CERTIFICATE OF CORRECTION

PATENT NO.    : 6,174,429 B1
DATED         : January 16, 2001
INVENTOR(S)   : George-Marchal et al.

It is certified that error appears in the above-identified patent and that said Letters Patent is hereby corrected as shown below:

<u>Column 14,</u>
Line 20, reads "about 6% a pore" should read -- about 6%, a pore --
Line 23, reads "20x10$^{-10}$ n and" should read -- 20x10$^{-10}$ m and --
Line 25, reads "1000x10$^{-10}$ with" should read -- 1000x10$^{-10}$ m with --

Signed and Sealed this

Eighth Day of January, 2002

Attest:

JAMES E. ROGAN
*Attesting Officer*     *Director of the United States Patent and Trademark Office*